Figure 1:
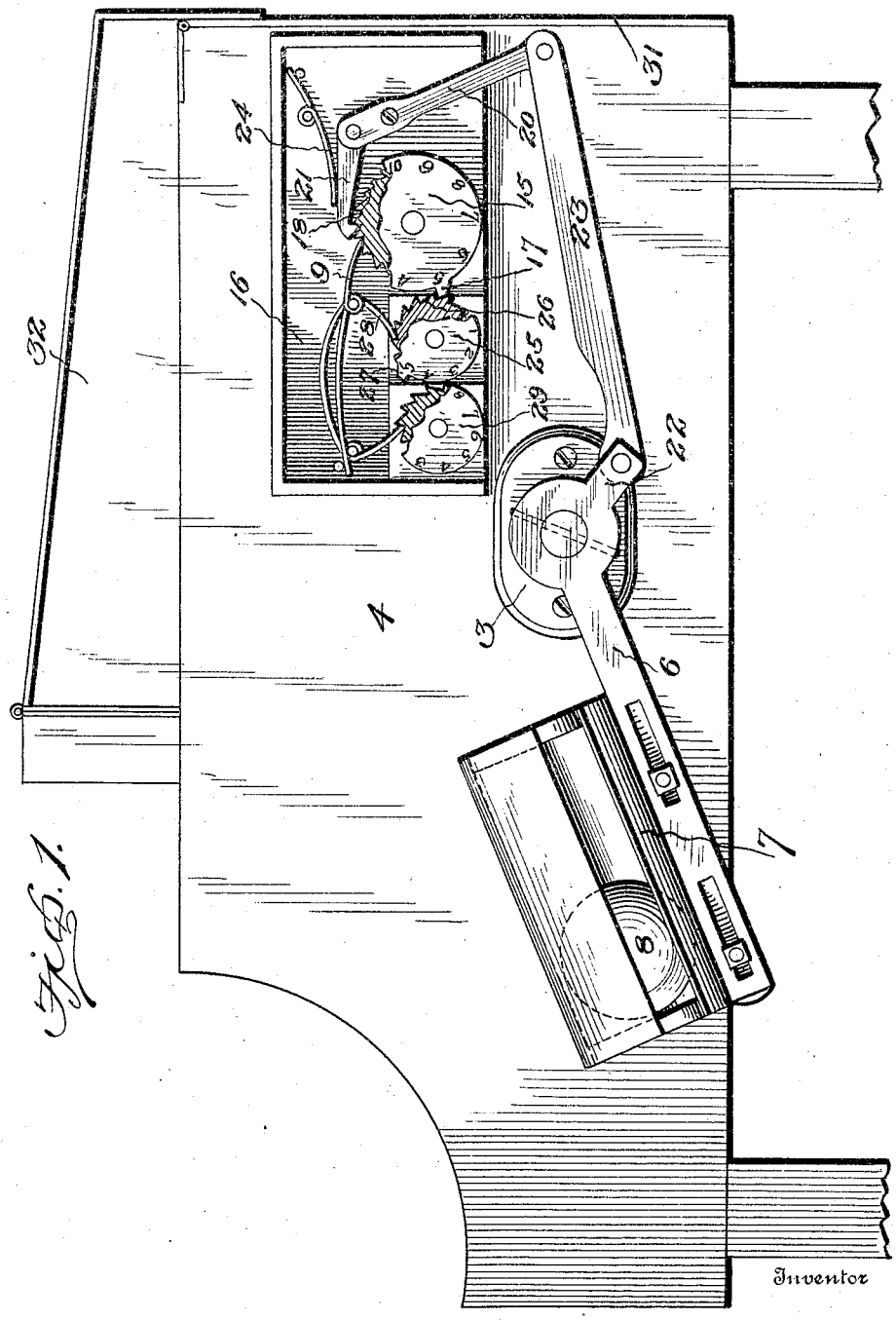

No. 773,707. PATENTED NOV. 1, 1904.
F. BEUTLER.
AUTOMATIC GRAIN MEASURER.
APPLICATION FILED APR. 13, 1904.
NO MODEL. 2 SHEETS—SHEET 1.

Witnesses
C. C. Hunt
L. O. Hilton

Inventor
Fred Beutler
By H. B. Wilson
Attorney

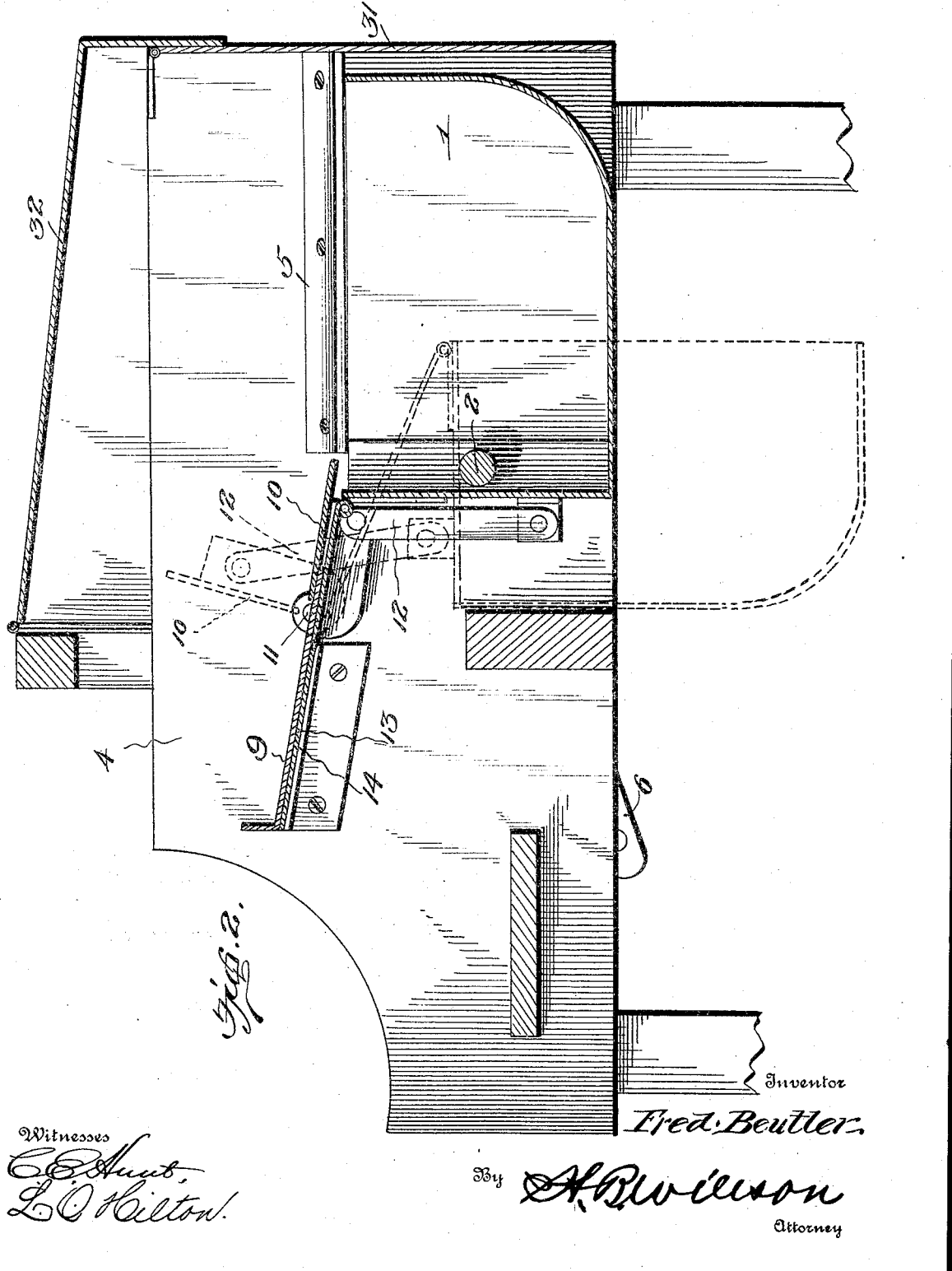

No. 773,707. Patented November 1, 1904.

UNITED STATES PATENT OFFICE.

FREDERICK BEUTLER, OF MANCHESTER, MICHIGAN.

AUTOMATIC GRAIN-MEASURER.

SPECIFICATION forming part of Letters Patent No. 773,707, dated November 1, 1904.

Application filed April 13, 1904. Serial No. 203,010. (No model.)

*To all whom it may concern:*

Be it known that I, FREDERICK BEUTLER, a citizen of the United States, residing at Manchester, in the county of Washtenaw and State of Michigan, have invented certain new and useful Improvements in Automatic Grain-Measurers; and I do declare the following to be a full, clear, and exact description of the invention, such as will enable others skilled in the art to which it appertains to make and use the same.

My invention is an improved automatic grain-measurer for operation to automatically measure grain while the same is passing from one point to another, as from a corn-shelling machine to a bin or other receptacle, and for keeping tally of the grain as it is measured; and my invention consists in the construction, combination, and arrangement of devices hereinafter described and claimed.

In the accompanying drawings, Figure 1 is a side elevation of my improved grain-measuring machine, showing the cover of the registering mechanism removed, so as to disclose the said registering mechanism. Fig. 2 is a vertical longitudinal sectional view of the same, showing the bucket in full lines in position to be filled and in position to dump its contents in dotted lines.

In the embodiment of my invention I provide a measuring and dumping bucket 1, which is here shown as of segmental cylindrical form and as having a pivot-axis 2 at its inner side. The said axis is journaled in bearings 3, which are on the sides of an inclosing casing 4. The said casing is provided on the inner sides of the side walls with batten or flange pieces 5, which coact with the sides of the bucket to stop the latter when in its normal raised position. Secured to the ends of the axis 2 are radial arms 6, which are disposed at an appropriate angle with reference to the bucket and are provided with radially-adjustable guides 7, in which are movable counterbalancing-weights 8. The said arms 6 being thus weighted serve to normally keep the measuring-bucket in its elevated position ready to be filled with grain, and when the bucket becomes filled with grain the weight of the latter causes the bucket to descend and the arms to be raised, so that the weights 8 move toward the pivot-axis of the bucket. The descent of the latter by the weight of the grain therein, which is a quantity forming a unit of measurement and predetermined by the weights 8 and the adjustment of their guides 7, causes the grain after having been thus measured in the bucket to be discharged therefrom by gravity, as will be understood, and when the bucket has been thus emptied of the grain therein the weight-arms return the bucket to its initial elevated position ready to be again filled with grain. Hence by keeping a record of the number of operations of the bucket the quantity of grain measured thereby can be accurately determined at any time.

The grain to be measured is discharged by gravity onto an inclined plane or chute 9 and is discharged therefrom by gravity into the bucket. A stop-gate 10 is disposed at the lower end of the said chute and from the inclined end of the bucket and is pivotally mounted at its inner side, as at 11, and is connected to the bucket by links 12, which when the bucket descends to discharge its contents by gravity causes the stop-gate to be automatically raised and to thereby discontinue the feeding of grain to the bucket. A plate 13 is pivotally connected at one end to the inner end of the bucket. The said plate travels on a support 14 and is disposed to operate under the chute 9. The function of the said plate is to prevent the spilling and waste of such grain as may chance to pass over the stop-gate 10 while the latter is being raised by the dumping action of the bucket.

I will now describe means for registering the number of operations of the bucket, so as to record the quantity of material which has been measured thereby. A disk 15 to indicate units is provided, being revoluble in a casing 16 of suitable size and shape, which is secured on one side of the casing 4. The said units-disk is provided wth a peripheral stud 17, that projects radially therefrom. On the inner side of the said disk are ratchet-teeth 18, which correspond in number and location with the units of the disk. A pawl 19 by engagement with the said ratchet-teeth prevents rotation of the units-disk in one direction. In order to rotate the latter in the opposite direction, I provide a pivot-arm 20, which carries a link pawl 21, which when the said disk is oscillated consecutively engages the ratchet-teeth of the units-disk and rotates the latter by a step-by-step movement to an extent corresponding with one unit of measurement at each operation of the measuring-bucket, oscillating motion being imparted to the said arm by means of an arm 22, which is rocked by the pivotal axis of the bucket and has connected thereto a pitman 23, which connects said arm to the arm 20. A spring 24 is here shown as bearing on the link pawl 21 to insure the engagement of the latter with the ratchet-teeth of the units-disk and the step-by-step rotation of the latter. Arranged next to the units-disk, to one side thereof and in a plane at an angle to that of the plane of the face of the disk 15, is a tens-disk 25, which is provided with ratchet-teeth 26 on its inner side corresponding to its subdivisions and with a radial spur 27. The spring 28 forms a detent which by engagement with the successive ratchet of the tens-disk prevents retrograde rotation and lost motion of the latter. The said tens-disk is so disposed with reference to the units-disk that the spur 17 of the latter at each rotation of the units-disk by engagement with one of the ratchet-teeth of the tens-disk moves the latter to an extent equal to the width of the space between two of its designating marks or figures. Adjacent to the tens-disk is a hundreds-disk 29, which is similar in construction to the tens-disk and is correspondingly operated by the spur of the latter. The number of the disks may be increased at will according to the desired capacity of the registering mechanism to record any desired quantity of grain.

The casing 4 is here shown as provided at its outer end with a gate 31 and as provided at its upper side with a cover 32.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a device of the class described, the combination of a pivotally-mounted measuring dump-bucket, counterbalancing means therefor, a chute in rear of and above the dump-bucket to discharge material by gravity thereinto, a pivotally-mounted plate movable in a vertical plane and forming a gate disposed on the discharge portion of the chute and also forming an extension of the chute when lowered, and a link connecting the dump-bucket and gate-plate and automatically raising the latter to cut off the supply of material from the chute to the bucket when the latter moves to dumping position.

2. In a device of the class described the combination of a pivotally-mounted measuring dump-bucket, an arm secured to and projecting radially from the pivotal axis thereof, a guide element adjustably connected to the said arm and carried thereby, and a movable weight in said guide, actuated by gravity during the reverse movement of the bucket, substantially as described.

In testimony whereof I have hereunto set my hand in presence of two subscribing witnesses.

FRED. BEUTLER.

Witnesses:
A. J. WATERS,
MAE McCOLLUM.